United States Patent
Nemiroff et al.

(10) Patent No.: US 10,902,825 B2
(45) Date of Patent: Jan. 26, 2021

(54) SYSTEM AND METHOD FOR PRE-FILTERING CRAWLING OVERLAY ELEMENTS FOR DISPLAY WITH REDUCED REAL-TIME PROCESSING DEMANDS

(71) Applicant: ARRIS Enterprises LLC, Suwanee, GA (US)

(72) Inventors: Robert S. Nemiroff, Carlsbad, CA (US); Jing Yang Chen, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/229,037

(22) Filed: Dec. 21, 2018

(65) Prior Publication Data

US 2020/0202819 A1 Jun. 25, 2020

(51) Int. Cl.
*G09G 5/397* (2006.01)
*G09G 5/34* (2006.01)
*H04N 5/445* (2011.01)

(52) U.S. Cl.
CPC .......... *G09G 5/397* (2013.01); *G09G 5/343* (2013.01); *H04N 5/44504* (2013.01); *G09G 2340/125* (2013.01)

(58) Field of Classification Search
CPC ...................................... G09G 5/343
USPC ..................................... 345/684
See application file for complete search history.

(56) References Cited

U.S. PATENT DOCUMENTS

| | | | | |
|---|---|---|---|---|
| 6,061,099 A * | 5/2000 | Hostetler | ........... | H04N 5/44504 348/584 |
| 7,028,029 B2 * | 4/2006 | Kamvar | ................ | G06F 16/951 |
| 7,305,610 B1 * | 12/2007 | Dean | ..................... | G06F 16/951 715/205 |
| 7,650,620 B2 * | 1/2010 | Fish | ....................... | G06Q 10/10 709/217 |
| 7,900,231 B2 * | 3/2011 | Paxton | ............... | H04N 21/2362 725/93 |
| 7,911,483 B1 * | 3/2011 | MacInnis | .................. | G06T 9/00 345/531 |
| 2004/0240541 A1* | 12/2004 | Chadwick | ............ | H04N 21/231 375/240.01 |
| 2005/0261584 A1* | 11/2005 | Eshel | ....................... | A61B 8/00 600/439 |
| 2008/0136841 A1* | 6/2008 | Oshitani | ............. | G01C 21/3673 345/636 |

(Continued)

OTHER PUBLICATIONS

Data sheet: Arris® publication, ME-7000: Converged Compression Platform, 365-095-26628 x7 May 2018.

(Continued)

*Primary Examiner* — Javid A Amini
(74) *Attorney, Agent, or Firm* — Chernoff, Vilhauer, McClung & Stenzel, LLP (57) ABSTRACT

A system and method are provided for reducing burden on real-time processing when combining overlay or crawl text with a primary video image. Based on a crawl rate of the crawl text, the method includes determining fractional pixel values associated with the crawl rate and pre-filtering the overlay or crawl text based on the established fractional pixel values, and combining windows of the various and appropriate pre-filtered overlay or crawl text with the primary image for encoding and delivery.

10 Claims, 7 Drawing Sheets

(56) References Cited

U.S. PATENT DOCUMENTS

| | | | | |
|---|---|---|---|---|
| 2009/0154816 | A1* | 6/2009 | Swazey | H04N 19/61 |
| | | | | 382/232 |
| 2010/0306249 | A1* | 12/2010 | Hill | G06Q 30/02 |
| | | | | 707/769 |
| 2012/0218256 | A1* | 8/2012 | Murray | H04N 5/278 |
| | | | | 345/419 |
| 2014/0282736 | A1* | 9/2014 | Elstermann | H04N 21/84 |
| | | | | 725/50 |
| 2016/0299563 | A1* | 10/2016 | Stafford | G02B 27/017 |
| 2017/0272701 | A1* | 9/2017 | King | H04N 7/181 |
| 2017/0353423 | A1* | 12/2017 | Morrison | H04L 51/32 |
| 2018/0341811 | A1* | 11/2018 | Bendale | G06T 7/11 |
| 2019/0098252 | A1* | 3/2019 | Tiger | H04N 5/9305 |
| 2019/0132405 | A1* | 5/2019 | Song | H04L 51/32 |

OTHER PUBLICATIONS

J. Chen, et al., "Algorithm Description of Joint Exploration Test Model 5 (JEM 5)", 5th JVET Meeting, Geneva, JVET-E1001-V2, Jan. 2017.

\* cited by examiner

SYSTEM AND METHOD FOR PRE-FILTERING CRAWLING OVERLAY ELEMENTS FOR DISPLAY WITH REDUCED REAL-TIME PROCESSING DEMANDS

BACKGROUND

Technical Field

The present device relates to the field of image processing and more specifically to a system and method for pre-filtering crawling overlay element(s) for display with reduced real-time processing demands.

Background

Crawling text, animating logos or other moving content across a portion of a video display (generically referenced as "crawl text"), such as at the top or bottom of a video display is commonplace. However, overlay of such crawl text in video can present a processor burden when the crawl text does not move by a whole number of pixels, as the crawl text image must be filtered based on any fractional pixel movement to avoid jitter of the crawl text as the filtering is conducted in real-time. What is needed is a system and method for pre-filtering crawl text for display with reduced real-time processing demands.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes receiving a primary video image wherein method can also comprise the step of receiving can also include receiving a crawl text image; establishing a crawl text rate and determining one or more fractional components based upon non-integer multiples of said crawl text rate. The method can also include pre-filtering said crawl text image based at least in part on said one or more determined fractional components to establish one or more pre-filtered crawl text images and combining said primary video image with one of said one or more pre-filtered crawl text images. Other embodiments of this aspect include corresponding computer systems, apparatus, and computer programs recorded on one or more computer storage devices, each configured to perform the actions of the methods.

Implementations may comprise one or more of the following features: encoding said combined primary video image and pre-filtered crawl text image, where said step of pre-filtering said crawl text image includes established and storing a plurality of pre-filtered crawl text images, each at least based in part on one of said determined fractional components. The method may also comprise encoding said combined primary video image and one of said pre-filtered crawl text images. Additionally, Implementations of the described techniques may include hardware, a method or process, or computer software on a computer-accessible medium.

Generally disclosed is also a system for reducing real-time processing including: receiving a primary video image in memory, receiving a crawl text image in memory, determining a crawl text rate, determining one or more fractional components based upon non-integer multiples of said crawl text rate, pre-filtering and storing in memory at least one fractionally filtered crawl text image based at least in part on said one or more fractional components, and combining said primary video image with said at least one fractionally filtered crawl text image. Other embodiments of this aspect include corresponding computer systems, apparatus, and computer programs recorded on one or more computer storage devices, each configured to perform the actions of the methods.

Further disclosed is a system of reducing real-time processing including: instantiating a primary video image in memory; instantiating a crawl text image in memory; determining a crawl text rate; determining one or more fractional components based upon non-integer multiples of said crawl text rate; instantiating a pre-filtered crawl text image in memory, based at least in part on said one or more fractional components; and combining said primary video image and one of said pre-filtered crawl text image and instantiating a combined image in memory. Other embodiments of this aspect include corresponding computer systems, apparatus, and computer programs recorded on one or more computer storage devices, each configured to perform the actions of the methods.

BRIEF DESCRIPTION OF THE DRAWINGS

Further details of the present device are explained with the help of the attached drawings in which.

DETAILED DESCRIPTION

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Figure 1A:
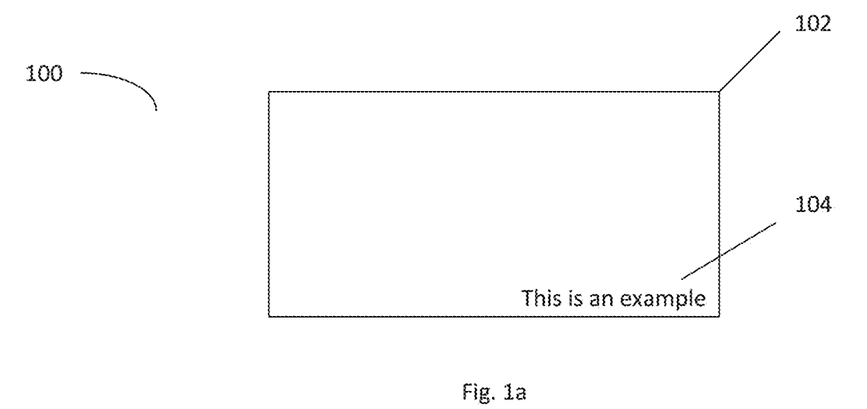
FIGS. 1a-1c depict an exemplary screen showing exemplary crawl text moving within a display.
Figure 1B:
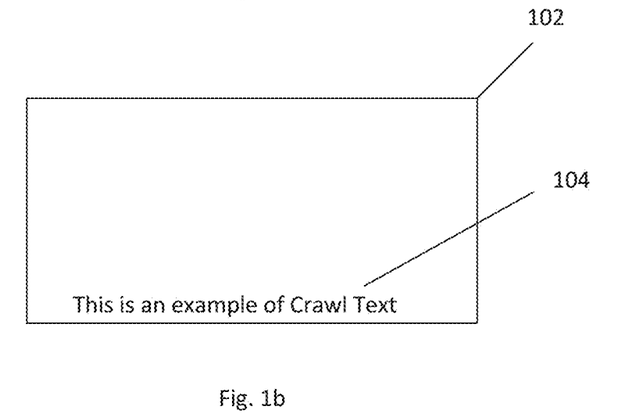
Figure 1C:
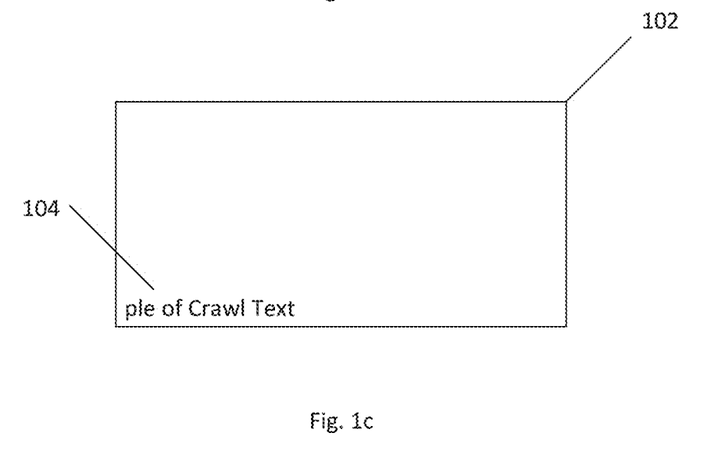

FIGS. 1a-1c depict an exemplary system 100 showing exemplary crawl text 104 moving within a display 102. As depicted in FIGS. 1a-1c, crawl text 104 in depicted as moving from right to left across the display 102. However, in some embodiments, such as for language in which text is read left-to-right or in an alternate sequence, crawl text can across the display 102 in any known, convenient and/or desired manner. Moreover, crawl text can appear on the display in any known, convenient and/or desired location. Finally, crawl text is not limited to text, but can be a graphic of any known, convenient and/or desired form that is not in a static position on the display.

Figure 2A:
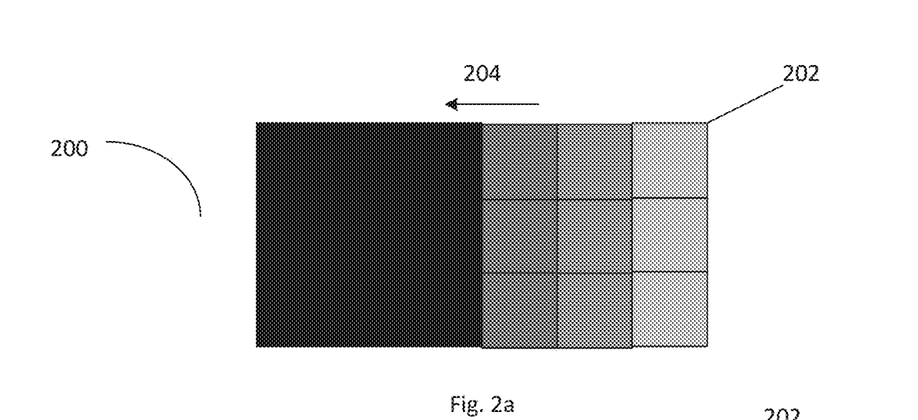
FIGS. 2a-2c depict an exemplary embodiment of a zoomed view of crawl text moving within a display.
Figure 2B:
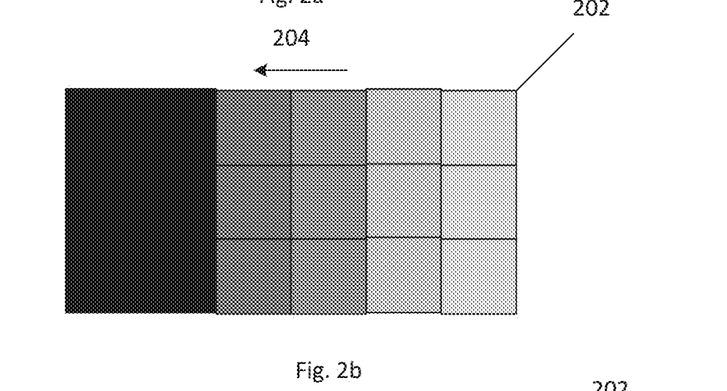
Figure 2C:
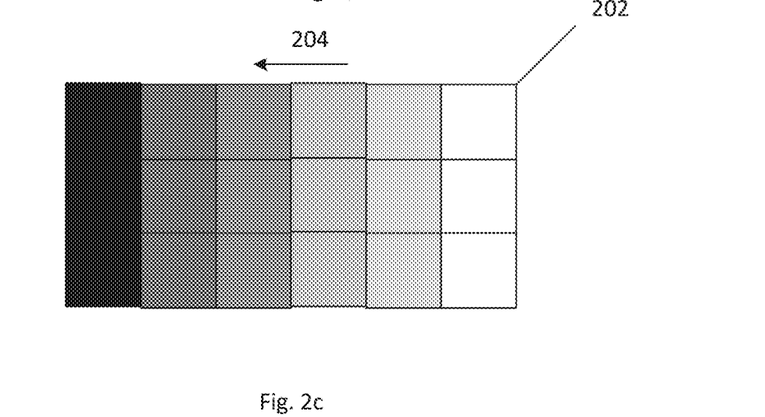

FIGS. 2a-2c depict an exemplary embodiment of a zoomed view of crawl text moving within a fixed display area 200. The pixels 202 depicted in each of FIGS. 2a-2c represent the display area 200 at different times as the crawl text moves from right to left 204 within the display area 200. As can be seen by viewing FIGS. 2a-2c, intensity (or other pixel data) can transition across pixels 202 within the display area from right to left from frame to frame to create motion of the crawl text across the display area 200. However, crawl text does not always move via integer values of pixels, but instead may move within the display area via an integer pixel value plus a fractional pixel value. In such cases, to avoid jitter in the crawl text, the crawl text image can be filtered to smooth crawl text image. In present embodiments, such filtering is performed in real time for each frame. However, such just-in-time processing is burdensome and inefficient, when the complete crawl text image is already known. In such instances where the fractional increments are known, the crawl text image can be pre-filtered for all desired or needed fractional increments and then the appropriate pre-filtered fractional image can be offset by the integer value of the increment for combination with the primary video feed. Thus, reducing burdensome real-time filtering of the crawl text.

Figure 3:
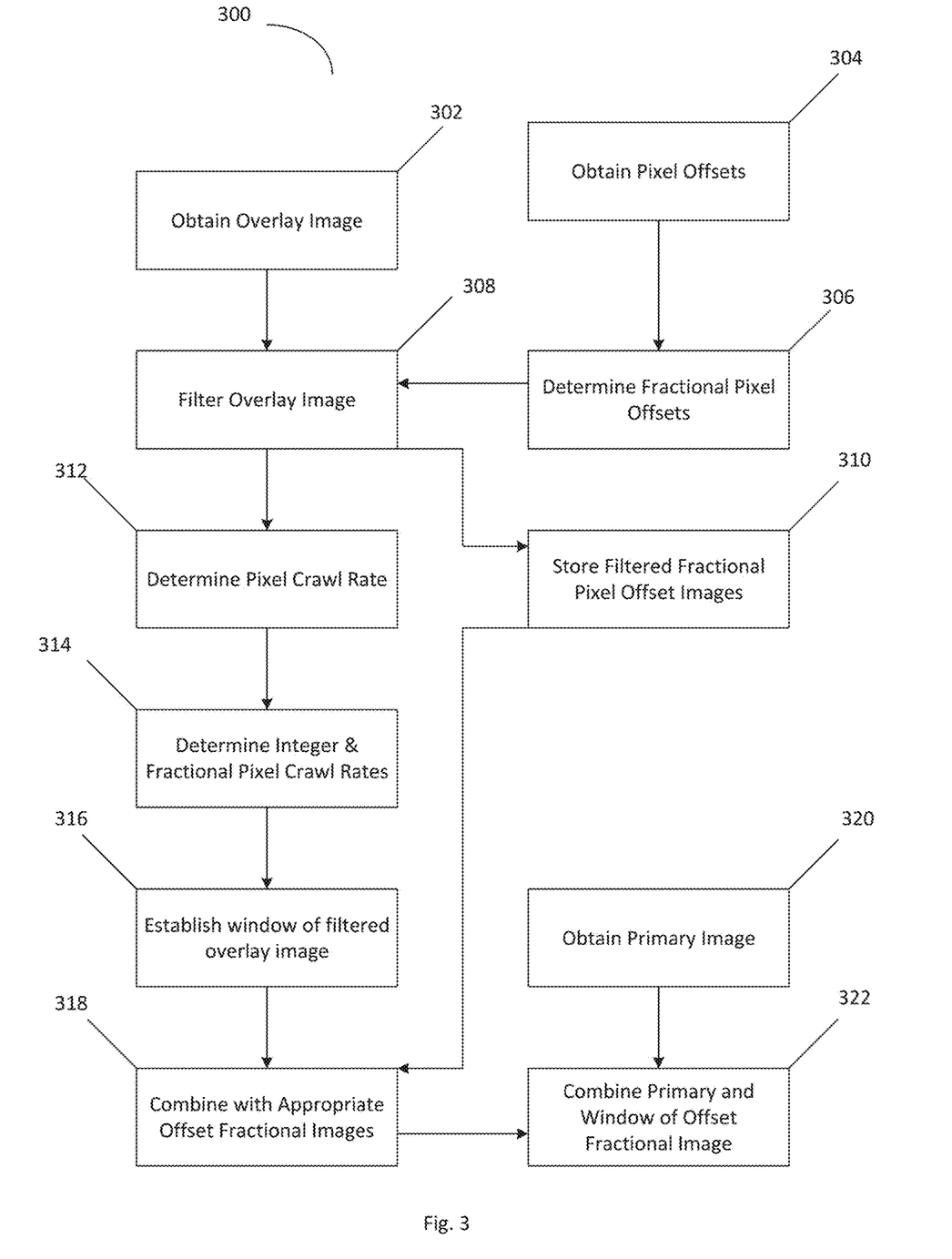
FIG. 3 depicts a method for pre-filtering crawl text for display with reduced real-time processing demands.

FIG. 3 depicts a method 300 for pre-filtering crawl text for display with reduced real-time processing demands. In step 302, an overlay or crawl text image is received and in step 304 pixel offset values can be established or determined. Then the known, convenient and/or desired fractional components of the pixel offset values can be determined in step 306.

In step 308, the crawl text image can be filtered for all fractional values determined in step 306 using any known, convenient and/or desired filtering technique and the filtered crawl text images can be stored in step 310.

In step 312, a desired crawl rate based at least in part on the delivery rate of the video to an end display device and integer and fractional portions of the desired crawl rate can be determined. Then in step 316 the integer portion of the crawl rate can be used to establish a pointer to determine the start pixel of a window (equivalent to the primary image) of the filtered crawl text image to be combined with the primary image. Then in step 318, the fractional portion of the desired crawl rate can be used to identify which of the pre-filtered crawl images to use for combination with the primary image.

Then in step 320 the primary image can be obtained and combined with the desired window of the selected pre-filtered crawl image in step 322 for delivery to the end display device.

By way of non-limiting example, if the motion or crawl rate is 2.25 pixels, then the filtered crawl text images for values of 0.25 pixels, 0.50 pixels and 0.75 pixels can be generated in step 308 and saved in step 310, as based on the crawl text rate of 2.25 pixels per frame will result in fractional values of 0.25, 0.50 and 0.75. A non-filtered crawl text image can also be stored in step 310 as filtering is not required for multiples of the crawl rate that are integer values. The for each frame, in step 316 the system and method can establish an offset value for the first pixel of a window of the filtered crawl text image can be established based on the integer value of the pixel offset and the correct filtered crawl text image can be determined based on the fractional component of the offset in step 318. That is for the first frame after the initial frame, the offset value would be 2 pixels (the integer component of 2.25 the pixel crawl). Thus, the system would select the 0.25 pixel filtered image and the first pixel of the window to be combined would be pixel 2. For the second frame after the initial frame, the offset value would be 4 (the integer component of 4.5 pixels-2×2.25 pixels) and the fractional component would be 0.50. Thus, the system and method would use the 0.50 pre-filtered crawl text image with a window starting at pixel 4. For the third frame after the initial frame, the offset value would be 6 (the integer component of 6.75 pixels-3×2.25 pixels) and the fractional component would be 0.75. Thus, the system and method would use the 0.75 pre-filtered crawl text image with a window starting at pixel 6. For the fourth frame after the initial frame, the offset value would be 9 (the integer component of 9.0 pixels-4×2.25 pixels) and the fractional component would be 0.00. Thus, the system and method would use the unfiltered filtered crawl text image with a window starting at pixel 9.

Figure 4A:
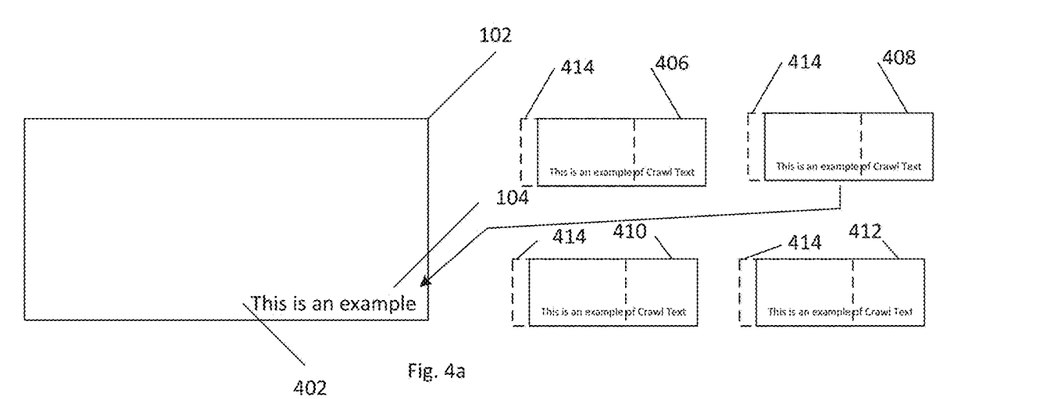
FIGS. 4a-4b depict an exemplary embodiment of a view of crawl text moving within a display in accordance with the method depicted in FIG. 3
Figure 4B:
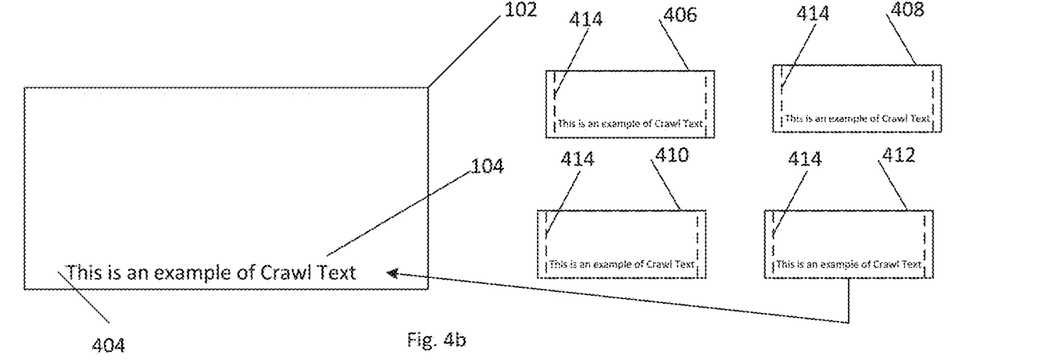

FIGS. 4a-4b depict an exemplary embodiment of a view of crawl text moving within a display in accordance with the method depicted in FIG. 3 and associated unfiltered crawl text 406 and various pre-filtered crawl text images 408 410 412. Additionally, FIGS. 4a-4b depict a sliding window 414 identifying the component of the crawl text 406 408 410 412 that can be used depending on the desired filtering and desired portion of the crawl text to be displayed. In the exemplary embodiment depicted in FIG. 4a, the crawl text 104 that appears within the display 102 can be offset by a first value 402 based on the combination of the primary image with the appropriate window of the pre-filtered crawl text image, such as 408, which can, by way of non-limiting example, represent the pre-filtered crawl text with a 0.25 pixel offset filter. In alternate embodiments, pre-filtered crawl text with any known, convenient and/or desired offset can be selected. Then in the exemplary embodiment depicted in FIG. 4b, the crawl text 104 that appears within the display 102 can be offset by a second value 404 based on the combination of the primary image with the appropriate window of the pre-filtered crawl text image, such as 408, which can, by way of non-limiting example, represent the pre-filtered crawl text with a 0.75 pixel offset filter. In alternate embodiments, pre-filtered crawl text with any known, convenient and/or desired offset can be selected.

Figure 5:
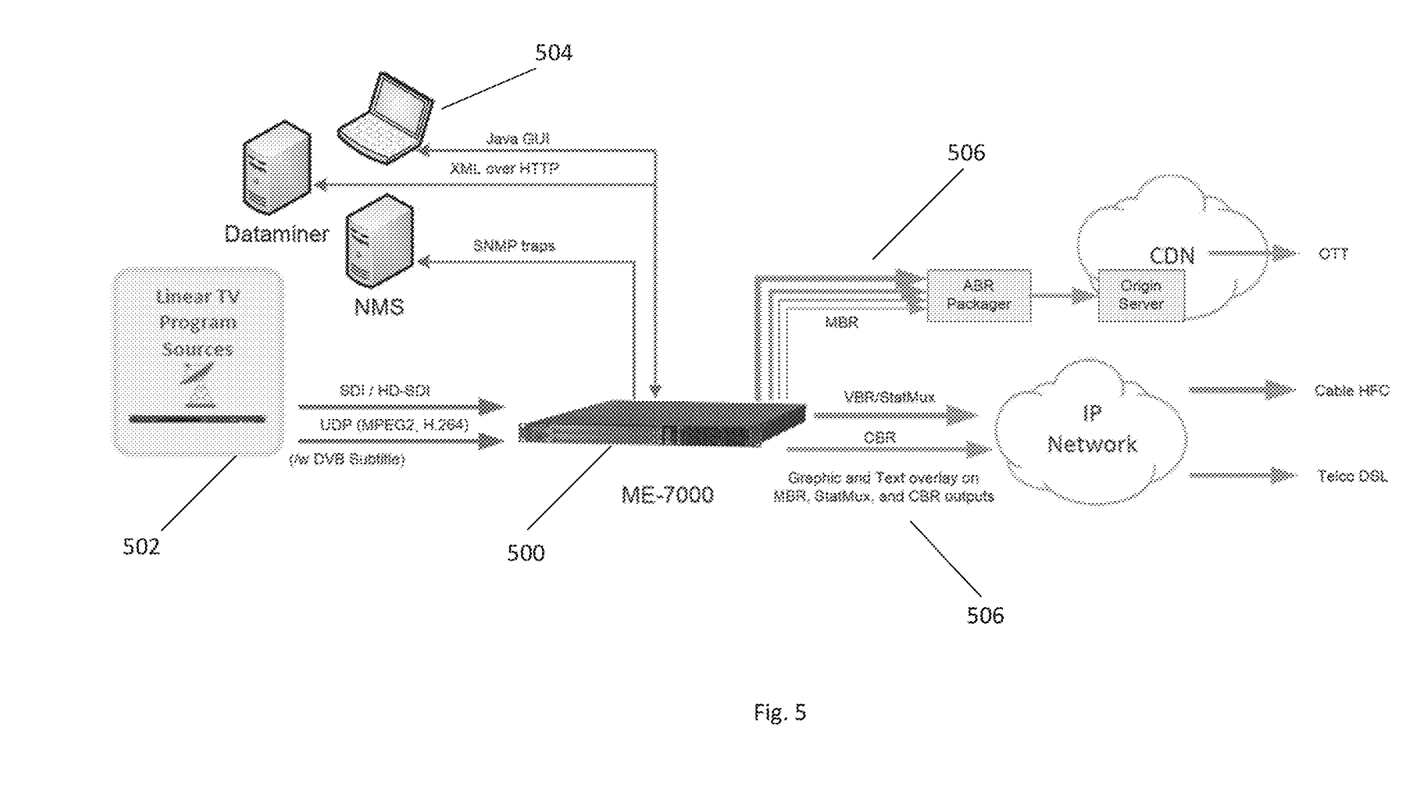
FIG. 5 depicts an embodiment of a multi-stream video delivery apparatus.

FIG. 5 depicts an embodiment of a multi-stream video delivery apparatus 500. In the embodiment depicted in FIG. 5, the multi-stream video delivery apparatus 500 can be an Arris® ME-7000 device the complete technical specification and data sheet of which are hereby incorporated herein by reference (Data sheet: Arris® publication, ME-7000: Converged Compression Platform, 365-095-26628 x7 05-2018). However, in alternate embodiments any known, convenient and/or desired video delivery apparatus adapted and configured to combine an overlay or crawl text image with a primary video image can be employed. In the embodiment depicted in FIG. 5, linear video programming 502 can be delivered to the apparatus 500 and overlay information 504 can be received from alternate sources. The apparatus can then overlay the linear video programming 502 with desired overlay information 504 based on the method described in relation to FIG. 4 and encoded using any known, convenient and/or desired coding technique for output 506 in various formats.

Figure 6:
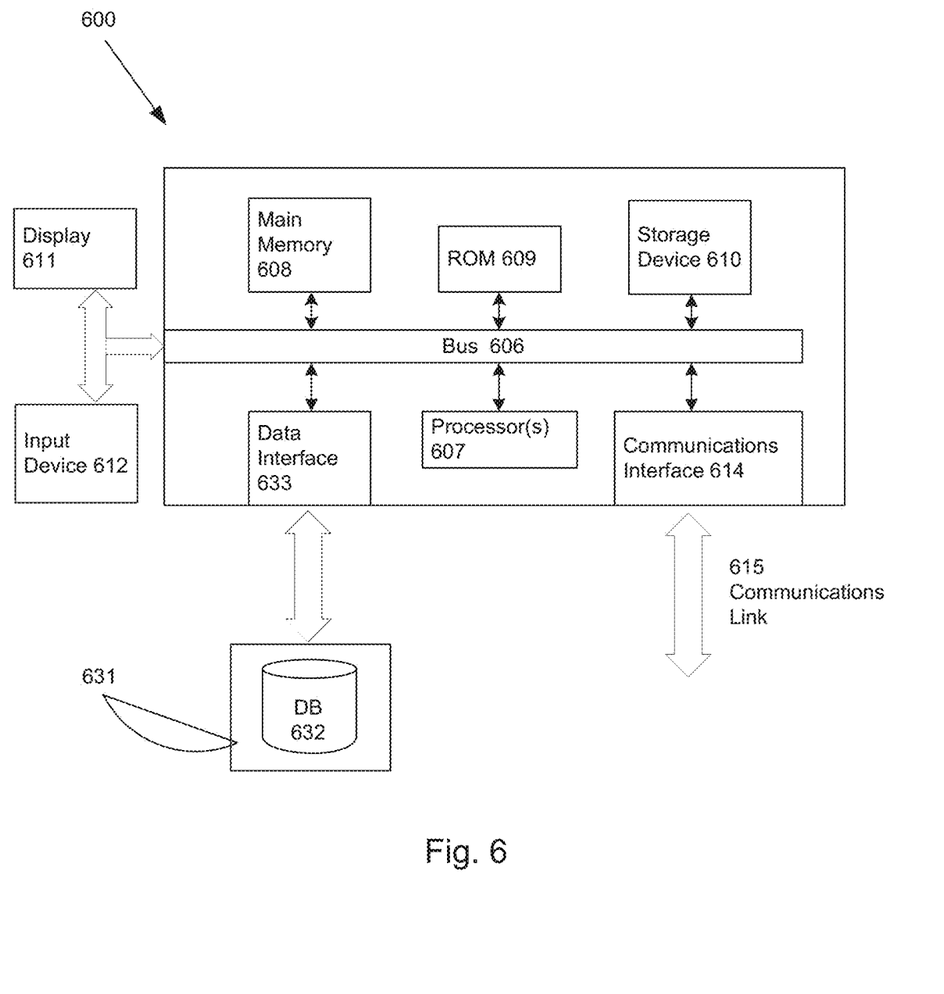
FIG. 6 depicts a computer system adapted and configured to execute and support the method and system described herein.

The execution of the sequences of instructions required to practice the embodiments can be performed by a computer system 600 as shown in FIG. 6. In an embodiment, execution of the sequences of instructions is performed by a single computer system 600. According to other embodiments, two or more computer systems 600 coupled by a communication link 615 can perform the sequence of instructions in coordination with one another. Although a description of only one computer system 600 will be presented below, however, it should be understood that any number of computer systems 600 can be employed to practice the embodiments.

A computer system 600 according to an embodiment will now be described with reference to FIG. 6, which is a block diagram of the functional components of a computer system 600. As used herein, the term computer system 600 is broadly used to describe any computing device that can store and independently run one or more programs.

Each computer system 600 can include a communication interface 614 coupled to the bus 606. The communication interface 614 provides two-way communication between computer systems 600. The communication interface 614 of a respective computer system 600 transmits and receives electrical, electromagnetic or optical signals, that include data streams representing various types of signal information, e.g., instructions, messages and data. A communication link 615 links one computer system 600 with another computer system 600. For example, the communication link 615 can be a LAN, in which case the communication interface 614 can be a LAN card, or the communication link 615 can be a PSTN, in which case the communication interface 614 can be an integrated services digital network (ISDN) card or a modem, or the communication link 615 can be the Internet, in which case the communication interface 614 can be a dial-up, cable or wireless modem.

A computer system 600 can transmit and receive messages, data, and instructions, including program, i.e., application, code, through its respective communication link 615 and communication interface 614. Received program code can be executed by the respective processor(s) 607 as it is received, and/or stored in the storage device 610, or other associated non-volatile media, for later execution.

In an embodiment, the computer system 600 operates in conjunction with a data storage system 631, e.g., a data storage system 631 that contains a database 632 that is readily accessible by the computer system 600. The computer system 600 communicates with the data storage system 631 through a data interface 633. A data interface 633, which is coupled to the bus 606, transmits and receives electrical, electromagnetic or optical signals, that include data streams representing various types of signal information, e.g., instructions, messages and data. In embodiments, the functions of the data interface 633 can be performed by the communication interface 614.

Computer system 600 includes a bus 606 or other communication mechanism for communicating instructions, messages and data, collectively, information, and one or more processors 607 coupled with the bus 606 for processing information. Computer system 600 also includes a main memory 608, such as a random access memory (RAM) or other dynamic storage device, coupled to the bus 606 for storing dynamic data and instructions to be executed by the processor(s) 607. The main memory 608 also can be used for storing temporary data, i.e., variables, or other intermediate information during execution of instructions by the processor(s) 607.

The computer system 600 can further include a read only memory (ROM) 609 or other static storage device coupled to the bus 606 for storing static data and instructions for the processor(s) 607. A storage device 610, such as a magnetic disk or optical disk, can also be provided and coupled to the bus 606 for storing data and instructions for the processor(s) 607.

A computer system 600 can be coupled via the bus 606 to a display device 611, such as, but not limited to, a cathode ray tube (CRT) or a liquid-crystal display (LCD) monitor, for displaying information to a user. An input device 612, e.g., alphanumeric and other keys, is coupled to the bus 606 for communicating information and command selections to the processor(s) 607.

According to one embodiment, an individual computer system 600 performs specific operations by their respective processor(s) 607 executing one or more sequences of one or more instructions contained in the main memory 608. Such instructions can be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 607. Such a medium can take many forms, including, but not limited to, non-volatile, volatile and transmission media. Non-volatile media, i.e., media that can retain information in the absence of power, includes the ROM 609, CD ROM, magnetic tape, and magnetic discs. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 7:
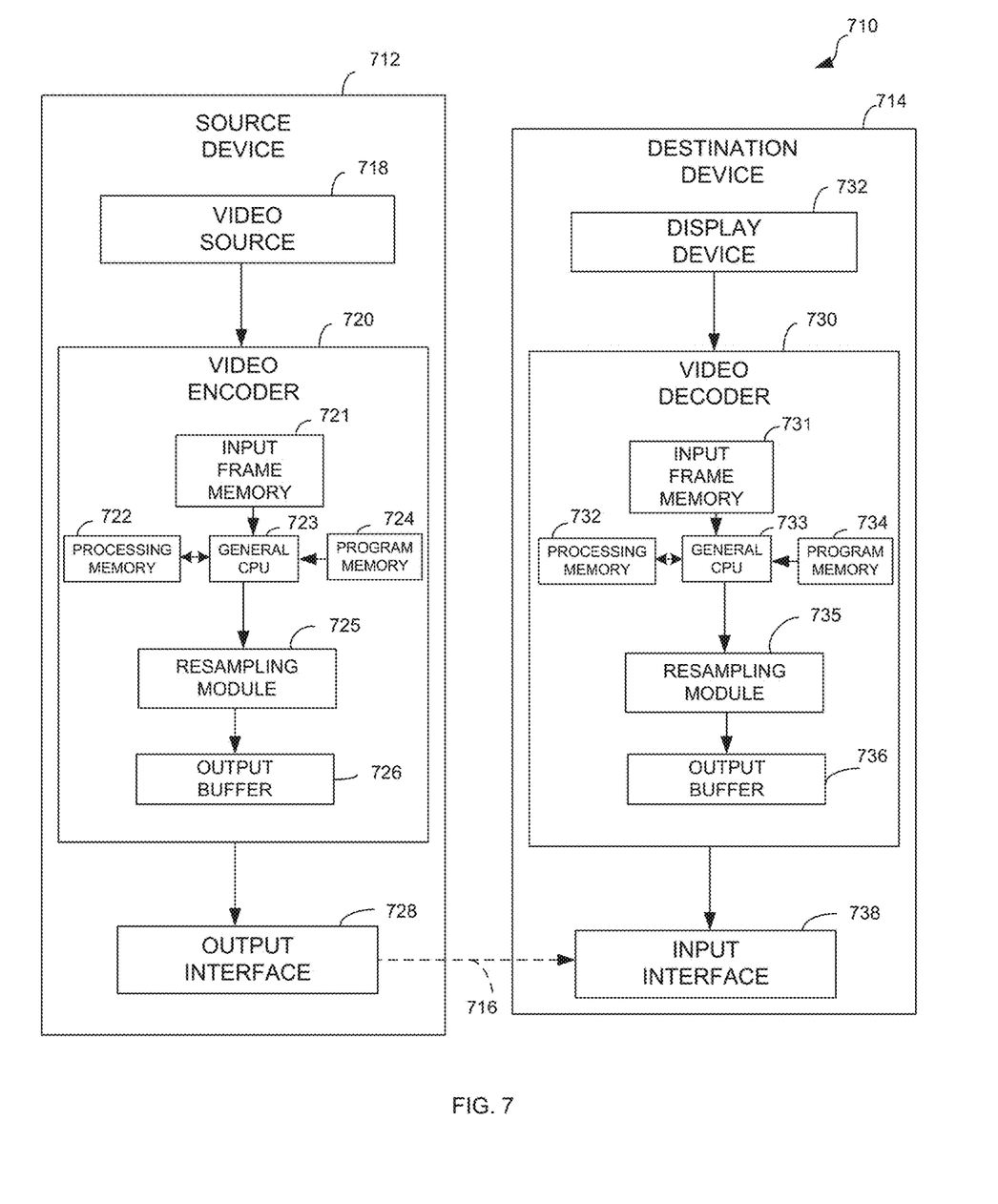
FIG. 7 depicts a high-level view of a source device 712 and destination device 710 that may incorporate features of the systems and devices described herein.

FIG. 7 is a high-level view of a source device 712 and destination device 710 that may incorporate features of the systems and devices described herein. As shown in FIG. 7, example video coding system 710 includes a source device 712 and a destination device 714 where, in this example, the source device 712 generates encoded video data. Accordingly, source device 712 may be referred to as a video encoding device. Destination device 714 may decode the encoded video data generated by source device 712. Accordingly, destination device 714 may be referred to as a video decoding device. Source device 712 and destination device 714 may be examples of video coding devices.

Destination device 714 may receive encoded video data from source device 712 via a channel 716. Channel 716 may comprise a type of medium or device capable of moving the encoded video data from source device 712 to destination device 714. In one example, channel 716 may comprise a communication medium that enables source device 712 to transmit encoded video data directly to destination device 714 in real-time.

In this example, source device 712 may modulate the encoded video data according to a communication standard, such as a wireless communication protocol, and may transmit the modulated video data to destination device 714. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 712 to destination device 714. In another example, channel 716 may correspond to a storage medium that stores the encoded video data generated by source device 712.

In the example of FIG. 7, source device 712 includes a video source 718, video encoder 720, and an output interface 722. In some cases, output interface 728 may include a modulator/demodulator (modem) and/or a transmitter. In source device 712, video source 718 may include a source such as a video capture device, e.g., a video camera, a video archive containing previously captured video data, a video feed interface to receive video data from a video content provider, and/or a computer graphics system for generating video data, or a combination of such sources.

Video encoder 720 may encode the captured, pre-captured, or computer-generated video data. An input image may be received by the video encoder 720 and stored in the input frame memory 721. The general purpose processor 723 may load information from here and perform encoding. The program for driving the general purpose processor may be loaded from a storage device, such as the example memory modules depicted in FIG. 7. The general purpose processor may use processing memory 722 to perform the encoding, and the output of the encoding information by the general processor may be stored in a buffer, such as output buffer 726.

The video encoder 720 may include a resampling module 725 which may be configured to code (e.g., encode) video data in a scalable video coding scheme that defines at least one base layer and at least one enhancement layer. Resampling module 725 may resample at least some video data as part of an encoding process, wherein resampling may be performed in an adaptive manner using resampling filters.

The encoded video data, e.g., a coded bit stream, may be transmitted directly to destination device 714 via output interface 728 of source device 712. In the example of FIG. 7, destination device 714 includes an input interface 738, a video decoder 730, and a display device 732. In some cases, input interface 728 may include a receiver and/or a modem. Input interface 738 of destination device 714 receives encoded video data over channel 716. The encoded video data may include a variety of syntax elements generated by video encoder 720 that represent the video data. Such syntax elements may be included with the encoded video data transmitted on a communication medium, stored on a storage medium, or stored a file server.

The encoded video data may also be stored onto a storage medium or a file server for later access by destination device 714 for decoding and/or playback. For example, the coded bitstream may be temporarily stored in the input buffer 731, then loaded in to the general purpose processor 733. The program for driving the general purpose processor may be loaded from a storage device or memory. The general purpose processor may use a process memory 732 to perform the decoding. The video decoder 730 may also include a resampling module 735 similar to the resampling module 725 employed in the video encoder 720.

FIG. 7 depicts the resampling module 735 separately from the general purpose processor 733, but it would be appreciated by one of skill in the art that the resampling function may be performed by a program executed by the general purpose processor, and the processing in the video encoder may be accomplished using one or more processors. The decoded image(s) may be stored in the output frame buffer 736 and then sent out to the input interface 738.

Display device 738 may be integrated with or may be external to destination device 714. In some examples, destination device 714 may include an integrated display device and may also be configured to interface with an external display device. In other examples, destination device 714 may be a display device. In general, display device 738 displays the decoded video data to a user.

Video encoder 720 and video decoder 730 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area. A recent capture of JVET development is described in the "Algorithm Description of Joint Exploration Test Model 5 (JEM 5)", WET-E1001-V2, authored by J. Chen, E. Alshina, G. Sullivan, J. Ohm, J. Boyce.

Additionally or alternatively, video encoder 720 and video decoder 730 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 720 and video decoder 730 may be implemented in hardware, software, firmware or any combination thereof. For example, the video encoder 720 and decoder 730 may employ one or more processors, digital signal processors (DSPs), application specific integrated circuits (ASICs), field programmable gate arrays (FPGAs), discrete logic, or any combinations thereof. When the video encoder 720 and decoder 730 are implemented partially in software, a device may store instructions for the software in a suitable, non-transitory computer-readable storage medium and may execute the instructions in hardware using one or more processors to perform the techniques of this disclosure. Each of video encoder 720 and video decoder 730 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general purpose processors 723 and 733 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 723 and 733.

A storage device may also store instructions, instructions, such as source code or binary code, for performing the techniques described above. A storage device may additionally store data used and manipulated by the computer processor. For example, a storage device in a video encoder 720 or a video decoder 730 may be a database that is accessed by computer system 723 or 733. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. A method of reducing real-time processing for scrolling a crawl text image at a constant crawl text rate across a display showing a primary image, the method comprising:
   receiving the primary video image;
   receiving a crawl text image;
   determining a value for the constant crawl text rate;
   determining one or more fractional components based upon multiples of a non-integer remainder of said value;
   pre-filtering said crawl text image based at least in part on said one or more determined fractional components to establish one or more pre-filtered crawl text images; and
   combining said primary video image with one of said one or more pre-filtered crawl text images;
   wherein the combined primary video image and pre-filtered crawl text are played in real time with the pre-filtering providing for reduced jitter of the crawl text without further filtering to reduce the real-time processing time required to perform the play.

2. The method of claim 1 further comprising encoding said combined primary video image and pre-filtered crawl text image.

3. The method of claim 1 wherein said step of pre-filtering said crawl text image comprises established and storing a plurality of pre-filtered crawl text images, each at least based in part on one of said determined fractional components.

4. The method of claim 3 further comprising encoding said combined primary video image and one of said pre-filtered crawl text images.

5. A system for reducing real-time processing for scrolling a crawl text image at a constant crawl text rate across a display showing a primary image, the system comprising:
- a memory configured to receive and store a primary video image and a crawl text image;
- a processor configured to determine a value for the constant crawl text rate;
- the processor determining one or more fractional components based upon multiples of a non-integer remainder of said value;
- the processor pre-filtering and storing in the memory at least one fractionally filtered crawl text image based at least in part on said one or more fractional components; and
- the processor combining said primary video image with said at least one fractionally filtered crawl text image;
- wherein the combined primary video image and pre-filtered crawl text are played in real time with the pre-filtering providing for reduced jitter of the crawl text without further filtering to reduce the real-time processing time required to perform the play.

6. The system of claim 5 further comprising encoding and storing in memory said combined primary video image and fractionally filtered crawl text image.

7. The system of claim 5 wherein said step of pre-filtering said crawl text image comprises established and storing in memory a plurality of pre-filtered crawl text images, each at least based in part on one of said determined fractional components.

8. The system of claim 7 further comprising encoding and storing in memory said combined primary video image and one of said fractionally filtered crawl text images.

9. The method of claim 1, wherein pre-filtering of the crawl text image is done independent of processing of the primary video image.

10. The system of claim 5, wherein pre-filtering of the crawl text image is done independent of processing of the primary video image.

* * * * *

UNITED STATES PATENT AND TRADEMARK OFFICE
CERTIFICATE OF CORRECTION

PATENT NO. : 10,902,825 B2
APPLICATION NO. : 16/229037
DATED : January 26, 2021
INVENTOR(S) : Robert S. Nemiroff and Jing Yang Chen It is certified that error appears in the above-identified patent and that said Letters Patent is hereby corrected as shown below:

In the Specification

Column 8, Line 62: Replace "(WET)" with --(JVET)--

Column 8, Line 67: Replace "WET" with --JVET--

Signed and Sealed this
Nineteenth Day of March, 2024

Katherine Kelly Vidal
Director of the United States Patent and Trademark Office